Patented June 23, 1936

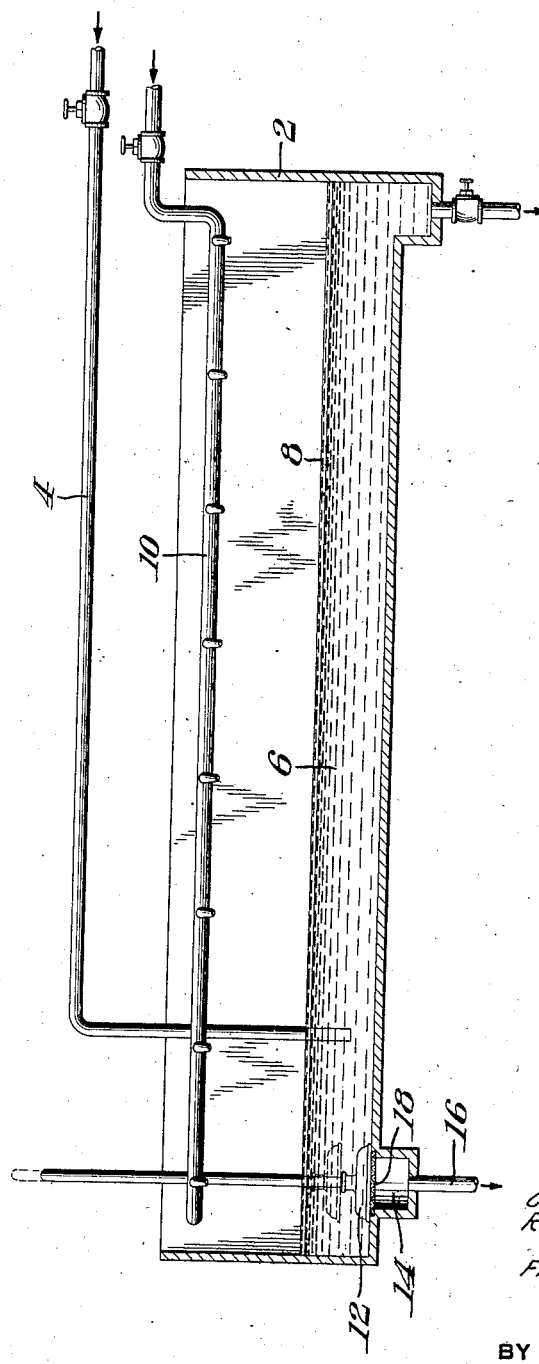

2,045,302

UNITED STATES PATENT OFFICE 2,045,302

PROCESS FOR CRYSTALLIZING SALTS

Theodore W. Langer, Clarence E. McBride, Russell J. Carlson, Mack Stow, and Frederick B. Clardy, Tulsa, Okla., assignors to Texaco Salt Products Company, New York, N. Y., a corporation of Delaware Application June 23, 1934, Serial No. 732,014

5 Claims. (Cl. 23—128)

This invention relates to the production of substantially uniform crystals of salts, such as magnesium sulfate.

When heated saturated or supersaturated solutions of salts of this type are cooled, crystals are precipitated and grow as the solution temperature falls. It has been found that by spraying a light film of water periodically over a solution of the concentrated liquid the formation of a crust on the solution is effectively prevented and crystal formation is improved.

In carrying out the present invention, a slightly undersaturated solution of the liquid to be precipitated is maintained in shallow evaporating pans. The solution is then maintained under quiescent conditions until substantial supersaturation occurs. A small quantity of water or other liquid is then sprayed over the surface of the liquid resulting in the immediate precipitation of crystals from the solution. Thereafter further quantities of the liquid are sprayed over the surface of the solution at sufficiently close intervals to effectively prevent the formation of a crust on the surface of the solution. The additional application of liquid to the surface of the solution also removes any supersaturation which may have occurred due to the further cooling of the solution.

The liquid sprayed upon the surface of the solution should be applied gently so as to prevent the applied liquid from mixing into and diluting the concentrated salt solution. It is found that even though the liquid is sprayed gently over the surface of the solution, this is sufficient to remove supersaturation and produce a corresponding new crystal formation.

Water is a satisfactory liquid to spray over the surface of the solution although a dilute solution of the same salt, for example, magnesium sulfate, can obviously be used.

While spraying has been referred to as the preferred means employed for removing supersaturation and producing crystal formation in the first instance, it is obvious that other means, such as agitation or seeding, may be employed and that spraying may then be used for covering the solution with a light film of the liquid thereby preventing crust formation on the surface and facilitating the cooling of the solution.

It will be understood that on the formation of a crust on the surface of the solution satisfactory cooling is prevented and, furthermore, the crust represents undesirable crystal formation.

In practising this invention, it is preferred to use shallow pools of the solution so that rapid cooling will occur from the surface of the solution and also so that substantially uniform precipitation throughout the solution can be produced by contacting the entire surface of the solution with the sprayed liquid.

The invention is particularly applicable to the production of seeding crystals, to be used in accordance with the invention of Theodore W. Langer, disclosed and claimed in an application filed concurrently herewith. The present invention represents an improvement over the disclosure in said Langer application.

Observation of the precipitating pans will indicate how often the liquid should be sprayed. The interval between sprays is found to vary from one-half hour to several hours. The appearance of any solid film on the surface of the solution will indicate that an additional application of the spray is desired.

In the drawing there is illustrated one form of apparatus which can be satisfactorily used for practising the present invention. The shallow evaporating pan 2 is constructed to receive a body of the concentrated solution 6 of the salt to be precipitated. The solution may be added conveniently through the valved pipe 4.

The liquid sprayed upon the surface of the concentrated solution is indicated as a film of water at 8. The liquid may be supplied through a hand hose provided with a suitable spray nozzle or may be supplied through a set of fixed spray nozzles formed on the valved liquid supply pipe 10.

The liquor may be drained from the tank by removing the plug 12 from the opening 14 leading to the discharge pipe 16. A screen 18 for the opening 14 prevents the discharge of the precipitated crystals with the liquor.

While specific details of the present invention have been set forth as required, it will be understood that variations may be made in the invention provided they fall within the scope of the appended claims.

We claim:

1. The method of producing salt crystals from a salt solution comprising maintaining a heated solution thereof under quiescent conditions until supersaturation occurs, producing precipitation of crystals therein and thereafter removing supersaturation by periodically spraying a film of water over said solution during crystal formation and growth.

2. The method of producing salt crystals from a salt solution comprising maintaining a heated solution thereof under quiescent conditions until supersaturation occurs and producing precipitation therein by spraying with a liquid comprising the solvent of said salt solution.

3. The method of producing salt crystals from a salt solution comprising maintaining a heated solution thereof under quiescent conditions until supersaturation occurs and producing precipitation therein by spraying repeatedly over the surface of said solution a liquid comprising the solvent of said salt solution.

4. The method of producing magnesium sulfate crystals from solution comprising maintaining a heated solution thereof under quiescent conditions until supersaturation occurs, producing precipitation of crystals therein and thereafter periodically spraying a film of water on the surface of said solution during crystal formation and growth to remove any supersaturation which has developed.

5. The method of producing magnesium sulfate crystals from solution comprising maintaining a heated solution thereof under quiescent conditions until supersaturation occurs and producing precipitation therein by spraying with a liquid comprising the solvent of said solution.

THEODORE W. LANGER.
CLARENCE E. McBRIDE.
RUSSELL J. CARLSON.
MACK STOW.
FREDERICK B. CLARDY.